United States Patent
Yasuda (12)

(10) Patent No.: US 6,495,851 B1
(45) Date of Patent: Dec. 17, 2002

(54) RADIATION IMAGE INFORMATION READ-OUT METHOD AND APPARATUS

(75) Inventor: Hiroaki Yasuda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 43 days.

(21) Appl. No.: 09/606,936

(22) Filed: Jun. 30, 2000

(30) Foreign Application Priority Data

Jun. 30, 1999 (JP) .......................................... 11-185351

(51) Int. Cl.$^7$ ............................................. G03B 42/08
(52) U.S. Cl. ..................................................... 250/587
(58) Field of Search ......................................... 250/587

(56) References Cited

U.S. PATENT DOCUMENTS

| | | | |
|---|---|---|---|
| 4,346,295 A | | 8/1982 | Tanaka et al. ............ 250/327.2 |
| 4,855,598 A | | 8/1989 | Ohgoda et al. .......... 250/327.2 |
| 4,896,037 A | | 1/1990 | Shimura et al. ......... 250/327.2 |
| 4,985,630 A | * | 1/1991 | Higaski et al. ............. 250/587 |
| 5,046,147 A | | 9/1991 | Funahashi et al. ........ 250/327.2 |
| 5,376,806 A | * | 12/1994 | Hejazi ........................ 235/375 |
| 5,602,402 A | * | 2/1997 | Yasuda ....................... 250/586 |
| 5,646,417 A | * | 7/1997 | Dewaele et al. ............ 250/584 |
| 6,016,356 A | | 1/2000 | Ito et al. ..................... 382/132 |

FOREIGN PATENT DOCUMENTS

| | | | |
|---|---|---|---|
| JP | 2-108175 | 4/1990 | .......... G06F/15/70 |
| JP | 7-319092 | 12/1995 | .......... G03B/42/02 |
| JP | 8-116435 | 5/1996 | .......... H04N/1/401 |

OTHER PUBLICATIONS

English language abstract 08–116435 May 7, 1996.

* cited by examiner

Primary Examiner—Constantine Hannaher
(74) Attorney, Agent, or Firm—Sughrue Mion, PLLC

(57) ABSTRACT

A stimulable phosphor sheet, on which radiation image information has been stored, is exposed to stimulating rays, which cause the stimulable phosphor sheet to emit light in proportion to the amount of energy stored thereon during its exposure to radiation. Light, which is emitted from opposite surfaces of the stimulable phosphor sheet when the stimulable phosphor sheet is exposed to the stimulating rays, is detected, and two original image signals representing the radiation image information are acquired. A read-out sensitivity and/or a read-out gain with respect to at least either one surface side of the stimulable phosphor sheet at the time of the image signal acquisition is controlled in accordance with specifications of the stimulable phosphor sheet.

19 Claims, 3 Drawing Sheets

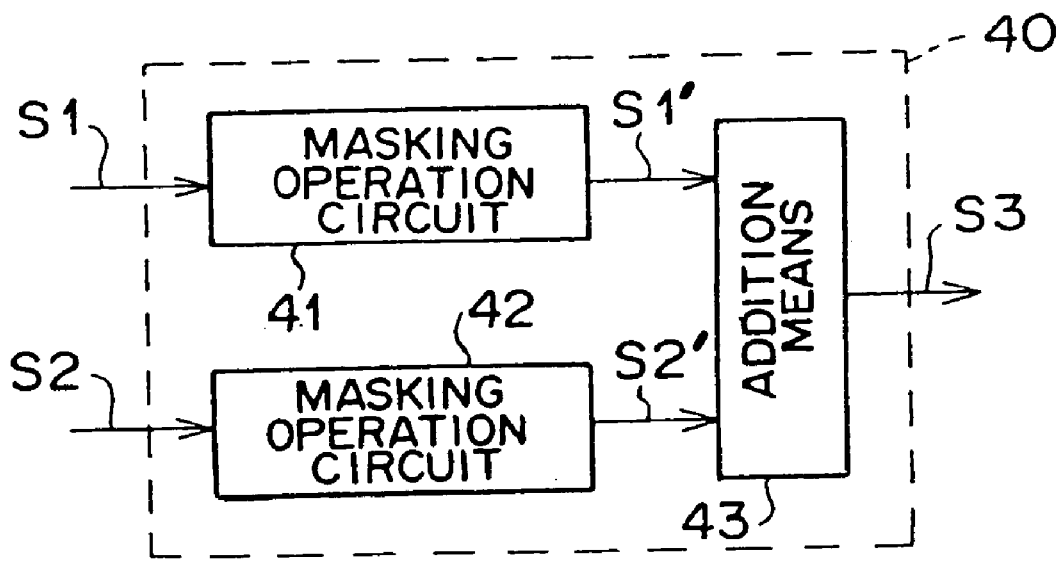
F I G . 3

RADIATION IMAGE INFORMATION READ-OUT METHOD AND APPARATUS

BACKGROUND OF THE INVENTION

1. Field of the Invention

This invention relates to a radiation image information read-out method and apparatus, wherein a technique for detecting light emitted from opposite surfaces of a stimulable phosphor sheet and thereby detecting two image signals from the opposite surfaces of the stimulable phosphor sheet is employed.

2. Description of the Related Art

In various fields, such as the medical field, techniques for reading out a radiation image of an object, which has been recorded on a stimulable phosphor sheet, to obtain an image signal, performing predetermined image processing on the image signal, and thereafter displaying a visible image, which is reproduced from the processed image signal, on an image display device, such as a cathode ray tube (CRT) display device, or outputting the visible image on film with a printer, such as a laser printer (LP), have heretofore been utilized. As apparatuses for reading out the radiation image, for example, computed radiography (CR) apparatuses, in which digital image processing techniques utilizing computers are employed, have heretofore been utilized.

The CR apparatuses are radiation image recording and read-out apparatuses. With the radiation image recording and read-out apparatuses, a radiation image of an object, such as a human body, is recorded on a sheet provided with a layer of a stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal with photoelectric read-out means, such as a photomultiplier. Recently, the CR apparatuses are widely used in practice.

As techniques for photoelectrically detecting light emitted by a stimulable phosphor sheet, the applicant proposed techniques for detecting light emitted from opposite surfaces of a stimulable phosphor sheet and thereby detecting two image signals from the opposite surfaces of the stimulable phosphor sheet in, for example, U.S. Pat. No. 4,346,295 and Japanese Unexamined Patent Publication No. 8(1996)-116435. With the proposed techniques, two photoelectric read-out means are located respectively on opposite surface sides of the stimulable phosphor sheet. Also, stimulating rays are irradiated to the two surfaces or only to one surface of the stimulable phosphor sheet, and the light, which is emitted by the stimulable phosphor sheet when it is exposed to the stimulating rays, is photoelectrically detected on the opposite surface sides of the stimulable phosphor sheet.

Specifically, with the techniques for detecting light emitted from opposite surfaces of a stimulable phosphor sheet and thereby detecting two image signals from the opposite surfaces of the stimulable phosphor sheet, a stimulable phosphor sheet is formed by overlaying a stimulable phosphor layer on a surface of a transparent substrate, and a radiation image is stored on the stimulable phosphor sheet. The stimulable phosphor sheet, on which the radiation image has been stored, is fitted on a transparent holder, and two photoelectric read-out means are located respectively above and below the holder. In this state, the light, which is emitted from one surface side of the stimulable phosphor sheet when the stimulable phosphor sheet is exposed to the stimulating rays, is detected by the photoelectric read-out means located above the holder, and an image signal (a one surface side image signal) is thereby detected. Also, the light, which is emitted from the other surface side of the stimulable phosphor sheet when the stimulable phosphor sheet is exposed to the stimulating rays, is detected by the photoelectric read-out means located below the holder, and an image signal (an other surface side image signal) is thereby detected.

Thereafter, an addition operation is performed on the image signal components of the two image signals having been detected from the opposite surfaces of the stimulable phosphor sheet (i.e., the one surface side image signal and the other surface side image signal), which image signal components represent corresponding pixels on the one surface and the other surface of the stimulable phosphor sheet, and an addition image signal (a superposition image signal) is thereby obtained. With the addition operation, high frequency noise occurring at random in each of the one surface side image signal and the other surface side image signal can be smoothed. Also, since the emitted light is collected from the two surfaces of the stimulable phosphor sheet, the light collecting efficiency can be enhanced. As a result, a superposition image, which has good image quality with an enhanced signal-to-noise ratio, can be reproduced from the addition image signal.

Also, as techniques for obtaining radiation image information by utilizing stimulable phosphor sheets, or the like, subtraction processing (subtraction operation) techniques have heretofore been known. With the subtraction processing techniques, a plurality of radiation images are recorded under different conditions and are then read out to obtain a plurality of image signals. Thereafter, a subtraction operation is performed on the plurality of the image signals, and a subtraction image signal is thereby obtained. In this manner, a subtraction image corresponding to the difference between the plurality of the radiation images, i.e. a subtraction image in which only a pattern of a specific object part (hereinbelow referred to also as a pattern of a tissue, a structure, or the like) in the radiation images has been enhanced or extracted, is obtained. Basically, the subtraction processing techniques may be classified into a temporal (time difference) subtraction processing technique and an energy subtraction processing technique. The applicant proposed various energy subtraction processing techniques utilizing stimulable phosphor sheets in, for example, U.S. Pat. Nos. 4,855,598 and 4,896,037.

Also, in order for a signal-to-noise ratio to be enhanced over the entire frequency band of an image obtained from the addition operation or the subtraction processing, the applicant proposed a technique for performing masking processing on the image signal obtained from each of the opposite surfaces of a stimulable phosphor sheet, such that a parameter (a weight factor) appropriate for each of the opposite surfaces and each of frequency bands can be utilized, as disclosed in, for example, Japanese Unexamined Patent Publication No. 7(1995)-319092.

Stimulable phosphor sheets have various different specifications. For example, stimulable phosphor sheets may have different sensitivities and may be classified into stimulable phosphor sheets having a standard sensitivity and stimulable phosphor sheets having a high sensitivity. If the sensitivity of the stimulable phosphor sheet varies, a width of the image signal corresponding to a desired read-out range (which width is referred to as the read-out gain), and/or a center value of the image signal corresponding to the center point of a desired read-out range (which center value is referred to as the read-out sensitivity), or a frequency response of the obtained image signal will vary. Also, besides the sensitivity, the particle size of the stimulable phosphor, the stimulable phosphor layer constitution, and the like, may vary for different generations of the stimulable phosphor sheets and, as a result, the frequency response of the obtained image signal varies.

Therefore, in cases where the specifications of the stimulable phosphor sheet vary, if the read-out sensitivity and/or the read-out gain or the parameters for the operation processing, such as the addition operation or the subtraction operation, are kept at predetermined values, an appropriate image cannot always be obtained.

SUMMARY OF THE INVENTION

The primary object of the present invention is to provide a radiation image information read-out method, wherein a technique for detecting light emitted from opposite surfaces of a stimulable phosphor sheet and thereby detecting two image signals from the opposite surfaces of the stimulable phosphor sheet is employed, and wherein an appropriate image is capable of being obtained from appropriate read-out processing regardless of specifications of the stimulable phosphor sheet.

Another object of the present invention is to provide an apparatus for carrying out the radiation image information read-out method.

The present invention provides a first radiation image information read-out method, comprising the steps of:
  i) exposing a stimulable phosphor sheet, on which radiation image information has been stored, to stimulating rays, which cause the stimulable phosphor sheet to emit light in proportion to the amount of energy stored thereon during its exposure to radiation, and
  ii) detecting light emitted from opposite surfaces of the stimulable phosphor sheet when the stimulable phosphor sheet is exposed to the stimulating rays, two original image signals representing the radiation image information being thereby acquired,
  wherein a read-out sensitivity and/or a read-out gain with respect to at least either one surface side of the stimulable phosphor sheet at the time of the image signal acquisition is controlled in accordance with specifications of the stimulable phosphor sheet.

The first radiation image information read-out method in accordance with the present invention should preferably be modified such that the controlling is performed such that the read-out sensitivities with respect to the opposite surfaces of the stimulable phosphor sheet become approximately identical with each other, and/or such that the read-out gains with respect to the opposite surfaces of the stimulable phosphor sheet become approximately identical with each other.

In the first radiation image information read-out method in accordance with the present invention, as a technique for controlling the read-out sensitivity, one of various techniques may be employed, with which the level of the image signal corresponding to the X-ray dose of a desired read-out range, e.g. the center value of the image signal corresponding to the center point of the desired read-out range, can be altered. As the technique for altering the center value of the image signal corresponding to the center point of the desired read-out range, for example, a technique for altering the voltage (high voltage) applied to a photomultiplier, which photoelectrically detects the emitted light, or a technique proposed by the applicant in, for example, Japanese Unexamined Patent Publication No. 2(1990)-108175, wherein signal transform is performed in accordance with a read-out sensitivity (a S value) in exposure data recognizer (EDR) processing in which no preliminary readout operation is performed, may be employed.

Also, as a technique for controlling the read-out gain, one of various techniques may be employed, with which the width of the image signal corresponding to the desired read-out range can be altered. For example, it is possible to employ a technique, wherein a gain of an amplifier for amplifying the signal obtained from the photomultiplier is altered, or a technique, wherein signal transform is performed in accordance with a latitude (a L value) in the EDR processing in which no preliminary readout operation is performed.

Further, in the first radiation image information read-out method in accordance with the present invention, in order for the read-out sensitivity or the read-out gain to be set in accordance with the specifications of the stimulable phosphor sheet, a table, which represents correspondence relationship between the specifications oft stimulable phosphor sheets and the read-out sensitivities or the read-out gains for the stimulable phosphor sheets, may be prepared. Reference may be made to the table, and the read-out sensitivity or the read-out gain may be set in accordance with the specifications of the stimulable phosphor sheet.

The present invention also provides a second radiation image information read-out method, comprising the steps of:
  i) exposing a stimulable phosphor sheet, on which radiation image information has been stored, to stimulating rays, which cause the stimulable phosphor sheet to emit light in proportion to the amount of energy stored thereon during its exposure to radiation,
  ii) detecting light emitted from opposite surfaces of the stimulable phosphor sheet when the stimulable phosphor sheet is exposed to the stimulating rays, two original image signals representing the radiation image information being thereby obtained, and
  iii) performing operation processing on the two original image signals to obtain an operation-processed image signal, which represents the radiation image information,
  wherein parameters for the operation processing are set in accordance with specifications of the stimulable phosphor sheet.

The second radiation image information read-out method in accordance with the present invention should preferably be modified such that, by the utilization of the first radiation image information read-out method in accordance with the present invention, a read-out sensitivity and/or a read-out gain with respect to at least either one surface side of the stimulable phosphor sheet at the time of the image signal acquisition is controlled in accordance with the discriminated specifications of the stimulable phosphor sheet.

In the second radiation image information read-out method in accordance with the present invention, the operation processing performed on the two original image signals may be typically the addition operation or the subtraction operation described above. However,the operation processing is not limited to the addition operation and the subtraction operation.

In order for the parameters for the operation processing to be set in accordance with the specifications of the stimulable phosphor sheet, a table, which represents correspondence relationship between the specifications of stimulable phosphor sheets and the parameters for the operation processing, may be prepared. Also, reference may be made to the table, and the parameters corresponding to the discriminated specifications of the stimulable phosphor sheet may be set. At this time, in cases where the specifications of the stimulable phosphor sheet are such that the stimulable phosphor sheet allows detection of an image signal from its one surface alone, the parameters for the operation processing may be set such that an image is constituted from only the image signal detected from the one surface of the stimulable phosphor sheet.

In the first and second radiation image information read-out methods in accordance with the present invention, the specifications of the stimulable phosphor sheet should preferably be discriminated automatically. For such purposes, one of various techniques for automatic discrimination may be employed. For example, a bar code representing the specifications of the stimulable phosphor sheet may be attached to the stimulable phosphor sheet or a cassette, which accommodates the stimulable phosphor sheet. Also, the bar code may be read with a bar code reader.

The present invention further provides an apparatus for carrying out the first radiation image information read-out method in accordance with the present invention. Specifically, the present invention further provides a first radiation image information read-out apparatus, comprising:

i) stimulating ray irradiation means for irradiating stimulating rays to a stimulable phosphor sheet, on which radiation image information has been stored, the stimulating rays causing the stimulable phosphor sheet to emit light in proportion to the amount of energy stored thereon during its exposure to radiation, and ii) image signal acquiring means for detecting light emitted from opposite surfaces of the stimulable phosphor sheet when the stimulable phosphor sheet is exposed to the stimulating rays, and thereby acquiring two original image signals representing the radiation image information, wherein the improvement comprises the provision of control means for controlling a read-out sensitivity and/or a read-out gain with respect to at least either one surface side of the stimulable phosphor sheet at the time of the image signal acquisition, the controlling being performed in accordance with specifications of the stimulable phosphor sheet.

The first radiation image information read-out apparatus in accordance with the present invention should preferably be modified such that the control means performs the controlling such that the read-out sensitivities with respect to the opposite surfaces of the stimulable phosphor sheet become approximately identical with each other, and/or such that the read-out gains with respect to the opposite surfaces of the stimulable phosphor sheet become approximately identical with each other.

The present invention still further provides an apparatus for carrying out the second radiation image information read-out method in accordance with the present invention. Specifically, the present invention still further provides a second radiation image information read-out apparatus, comprising:

i) stimulating ray irradiation means for irradiating stimulating rays to a stimulable phosphor sheet, on which radiation image information has been stored, the stimulating rays causing the stimulable phosphor sheet. to emit light in proportion to the amount of energy stored therein during its exposure to radiation, ii) image signal acquiring means for detecting light emitted from opposite surfaces of the stimulable phosphor sheet when the stimulable phosphor sheet is exposed to the stimulating rays, and thereby acquiring two original image signals representing the radiation image information, and iii) operation-processed image signal forming means for performing operation processing on the two original image signals to obtain an operation-processed image signal, which represents the radiation image information, wherein the improvement comprises the provision of parameter setting means for setting parameters for the operation processing in accordance with specifications of the stimulable phosphor sheet.

As in the first radiation image information read-out apparatus in accordance with the present invention, the second radiation image information read-out apparatus in accordance with the present invention should preferably further comprise control means for controlling a read-out sensitivity and/or a read-out gain with respect to at least either one surface side of the stimulable phosphor sheet at the time of the image signal acquisition, the controlling being performed in accordance with the discriminated specifications of the stimulable phosphor sheet.

The first and second radiation image information read-out apparatuses in accordance with the present invention should preferably further comprise discrimination means for discriminating the specifications of the stimulable phosphor sheet.

With the first radiation image information read-out method and apparatus in accordance with the present invention, the read-out sensitivity and/or the read-out gain with respect to at least either one surface side of the stimulable phosphor sheet at the time of the image signal acquisition is controlled in accordance with specifications of the stimulable phosphor sheet. Therefore, in cases where a stimulable phosphor sheet having a different sensitivity is utilized, the image read-out operation can be performed by setting the read-out sensitivity and/or the read-out gain appropriate for the stimulable phosphor sheet, and an appropriate image can be obtained.

With the second radiation image information read-out method and apparatus in accordance with the present invention, the parameters for the operation processing, such as the addition operation or the subtraction operation, are set in accordance with the specifications of the stimulable phosphor sheet. Therefore, in cases where the particle size of the stimulable phosphor, the stimulable phosphor layer constitution, and the like, vary for different generations of the stimulable phosphor sheets, the operation processing can be performed with the parameters appropriate for the utilized stimulable phosphor sheet, and an appropriate image can be obtained.

Also, in cases where the specifications of the stimulable phosphor sheet are such that the stimulable phosphor sheet allows detection of an image signal from its one surface alone, the parameters for the operation processing may be set such that an image is constituted from only the image signal detected from the one surface of the stimulable phosphor sheet. In this manner, an image can be reproduced from only the image signal, which has been detected accurately from one surface side (e.g., the stimulating ray irradiation surface side) of the stimulable phosphor sheet.

Therefore, with the radiation image information read-out methods and apparatuses in accordance with the present invention, appropriate read-out processing can be performed regardless of the specifications of the stimulable phosphor sheet, and an appropriate image can thereby be obtained.

BRIEF DESCRIPTION OF THE DRAWINGS

FIG. 3 is a block diagram showing an operation processing circuit.

DESCRIPTION OF THE PREFERRED EMBODIMENTS

The present invention will hereinbelow be described in further detail with reference to the accompanying drawings.

Figure 1:
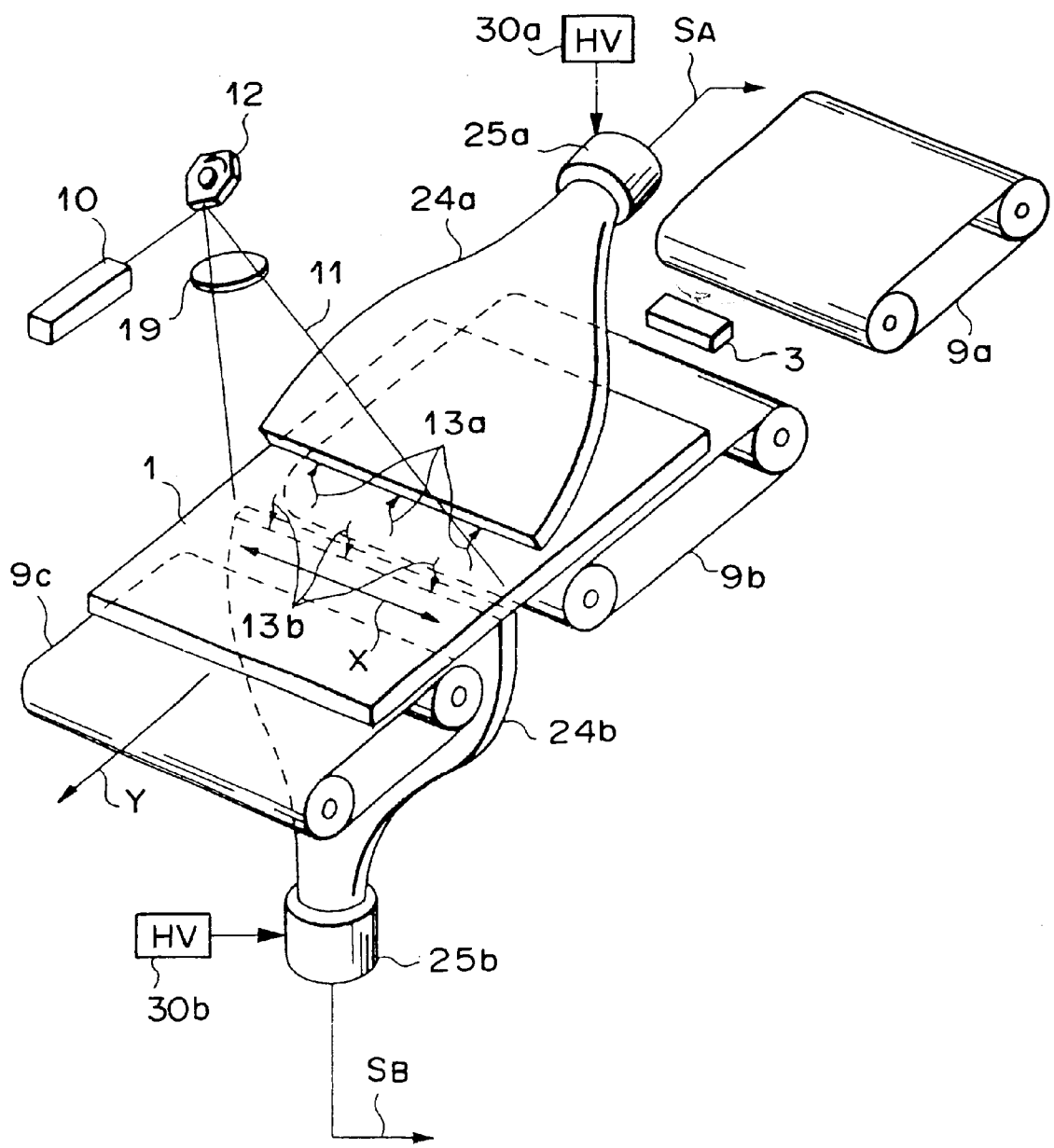
FIG. 1 is a perspective view showing an embodiment of the radiation image information read-out apparatus in accordance with the present invention, in which a technique for detecting light emitted from opposite surfaces of a stimulable phosphor sheet and thereby detecting two image signals from the opposite surfaces of the stimulable phosphor sheet is employed.
Figure 2:
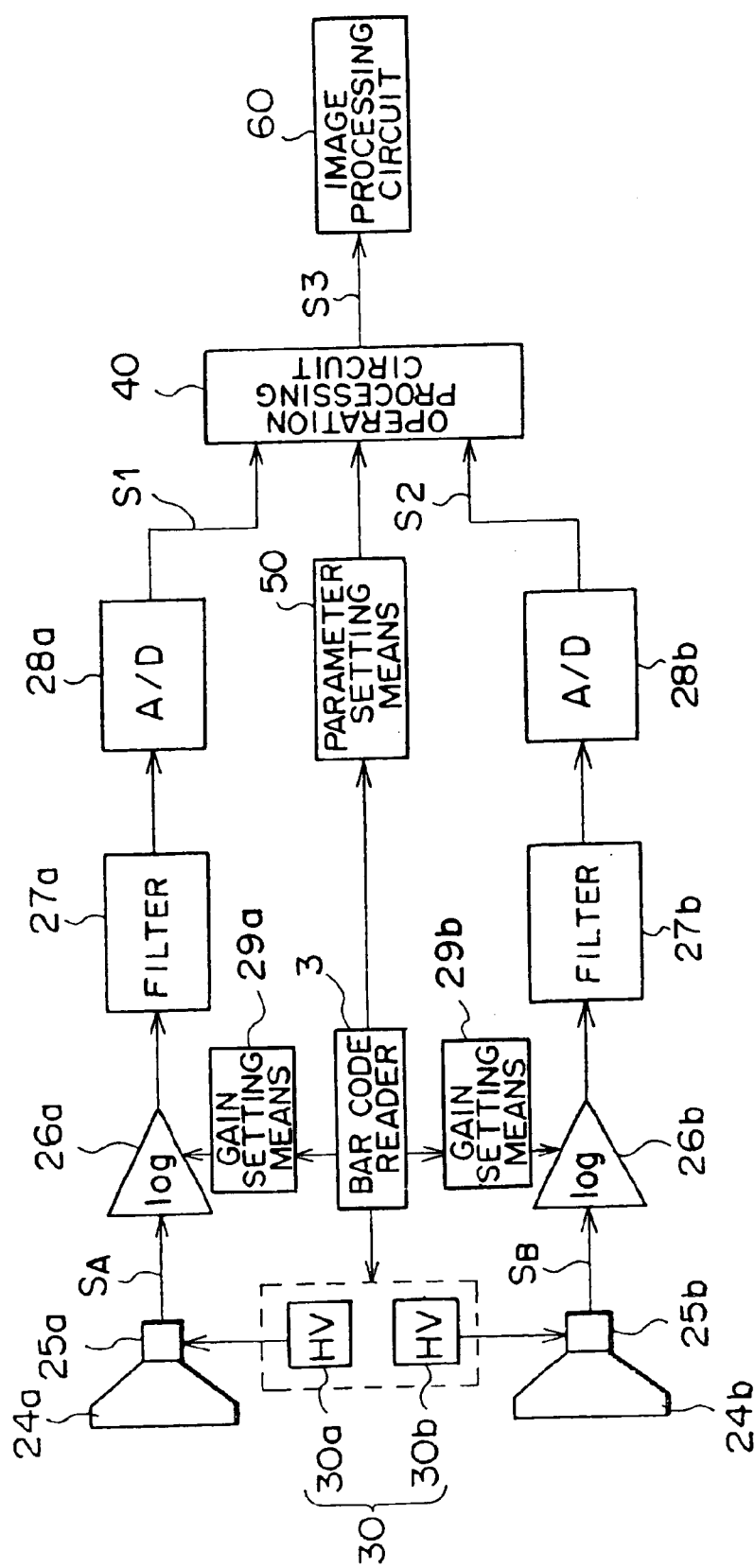
FIG. 2 is a circuit block diagram showing how signal processing is performed in the embodiment of FIG. 1.

FIG. 1 is a perspective view showing an embodiment of the radiation image information read-out apparatus in accordance with the present invention, in which a technique for detecting light emitted from opposite surfaces of a stimulable phosphor sheet and thereby detecting two image signals from the opposite surfaces of the stimulable phosphor sheet is employed. FIG. 2 is a circuit block diagram showing how signal processing is performed in the embodiment of FIG. 1.

As illustrated in FIG. 1, in the radiation image information read-out apparatus, a stimulable phosphor sheet 1, on which radiation image information has been stored, is placed on endless belts 9a, 9b, and 9c, which are rotated by motors (not shown). A bar code reader 3, which acts as discrimination means for discriminating the specifications of the stimulable phosphor sheet 1, is located between the endless belts 9a and 9b.

A laser beam source 10, a rotating polygon mirror 12, and a scanning lens 19 are located above the stimulable phosphor sheet 1, which is placed on the endless belts 9b and 9c. The laser beam source 10 produces a laser beam 11 acting as stimulating rays, which cause the stimulable phosphor sheet 1 to emit light in proportion to the amount of energy stored thereon during its exposure to radiation. The rotating polygon mirror 12 reflects and deflects the laser beam 11 having been produced by the laser beam source 10 and causes the laser beam 11 to scan the stimulable phosphor sheet 1 in main scanning directions indicated by the double headed arrow X. The rotating polygon mirror 12 is rotated by a motor (not shown). The scanning lens 19 converges the laser beam 11, which has been reflected and deflected by the rotating polygon mirror 12, onto the stimulable phosphor sheet 1 and causes the laser beam 11 to scan the stimulable phosphor sheet 1 at uniform speed. A light guide member 24a is located above and close to the position that is scanned with the laser beam 11. The light guide member 24a guides the light, which is emitted by the stimulable phosphor sheet when the stimulable phosphor sheet 1 is scanned with the laser beam 11, from above. Also, a light guide member 24b is located below the position that is scanned with the laser beam 11. The light guide member 24b is located perpendicularly to the stimulable phosphor sheet 1 and guides the emitted light from below. The light guide member 24a is connected to a photomultiplier 25a for photoelectrically detecting the emitted light. Also, the light guide member 24b is connected to a photomultiplier 25b for photoelectrically detecting the emitted light. The photomultiplier 25a is connected to voltage applying means (HV) 30a, which constitutes sensitivity setting means 30 acting as an example of control means. Also, the photomultiplier 25b is connected to voltage applying means (HV) 30b, which constitutes the sensitivity setting means 30. The laser beam source 10, the rotating polygon mirror 12, and the scanning lens 19 constitute the stimulating ray irradiation means of the radiation image information read-out apparatus in accordance with the present invention. Also, the light guide members 24a, 24b and the photomultipliers 25a, 25b constitute the image signal acquiring means of the radiation image information read-out apparatus in accordance with the present invention.

As illustrated in FIG. 2, the output of the photomultiplier 25a is connected to a logarithmic amplifier 26a. The output of the logarithmic amplifier 26a is connected to a filter 27a. The output of the filter 27a is connected to an analog-to-digital converter 28a. Also, the output of the photomultiplier 25b is connected to a logarithmic amplifier 26b. The output of the logarithmic amplifier 26b is connected to a filter 27b. The output of the filter 27b is connected to an analog-to-digital converter 28b. The output of the analog-to-digital converter 28a and the output of the analog-to-digital converter 28b are connected to an operation processing clircuit 40, which acts as the operation-processed image signal forming means. The output of the operation processing circuit 40 is connected to an image processing circuit 60. Alsol, parameter setting means 50 is connected to the operation processing circuit 40.

As the logarithmic amplifiers 26a and 26b, variable-gain amplifiers are employed. Gain setting means 29a, which is an example of the control means, is connected to the logarithmic amplifier 26a. Also, gain setting means 29b, which is an example of the control means, is connected to the logarithmic amplifier 26b.

The output of the bar code reader 3 is connected to the sensitivity setting means 30, the gain setting means 29a, 29b, and the parameter setting means 50.

When radiation image signals are to be obtained with the radiation image read-out apparatus, the stimulable phosphor sheet 1, on which the radiation image information of an object has been stored, is set on the endless belt 9a. The stimulable phosphor sheet 1 is conveyed by the endless belt 9a in the direction (sub-scanning direction), which is indicated by the arrow Y. The stimulable phosphor sheet 1 is thus moved toward the endless belt 9b. The stimulable phosphor sheet 1 is appended with a bar code, which represents the specifications of the stimulable phosphor sheet 1. When the stimulable phosphor sheet 1 is moved from the endless belt 9a toward the endless belt 9b, the bar code appended to the stimulable phosphor sheet 1 is read by the bar code reader 3.

The bar code represents the information, such as the sensitivity of the stimulable phosphor sheet 1, the particle size of the stimulable phosphor, and the stimulable phosphor layer constitution. The information having been read by the bar code reader 3 is fed into the sensitivity setting means 30 and the parameter setting means 50.

In the sensitivity setting means 30, a table representing correspondence relationship between the specifications of the stimulable phosphor sheet 1 and the read-out sensitivities (i.e., the center values of photomultiplier outputs (the image signals) corresponding to the center points of desired read-out ranges) is prepared previously. The sensitivity setting means 30 makes reference to the table and sets the read-out sensitivity of at least either one of the photomultipliers 25a and 25b in accordance with the specifications of the stimulable phosphor sheet 1 and on the basis of the information received from the bar code reader 3, such that the ratio between the read-out sensitivity on the stimulating ray irradiation surface side of the stimulable phosphor sheet 1 and the read-out sensitivity on the other surface side of the stimulable phosphor sheet 1 may become identical with a predetermined value, or such that the read-out sensitivity on the stimulating ray irradiation surface side of the stimulable phosphor sheet 1 and the read-out sensitivity on the other surface side of the stimulable phosphor sheet 1 may become approximately identical with each other. The setting of the read-out sensitivity is performed by altering and setting the magnitude of the high voltage applied to the photomultiplier 25a and/or the photomultiplier 25b.

Also, in the gain setting means 29a and 29b, a table representing correspondence relationship between the specifications of the stimulable phosphor sheet 1 and the read-out gains (i.e., the widths of photomultiplier outputs (the image signals) corresponding to desired read-out ranges) is prepared previously. The gain setting means 29a and 29b make reference to the table and set the read-out gain by controlling the amplifier gain of at least either one of the logarithmic amplifiers 26a and 26b in accordance with the specifications of the stimulable phosphor sheet 1 and on the basis of the information received from the bar code reader 3, such that the amplifier output width (i.e., the width of the image signal) on the stimulating ray irradiation surface side of the stimulable phosphor sheet 1 and the amplifier output width on the other surface side of the stimulable phosphor sheet 1 may become approximately identical with each other.

Further, in the parameter setting means 50, a table representing correspondence relationship between the specifications of the stimulable phosphor sheet 1 and the parameters for the operation processing is prepared previously. The parameter setting means 510 makes reference to the table and sets the parameters for the operation processing corresponding to the specifications of the stimulable phosphor sheet 1 in the operation processing circuit 40 and in accordance with the information received from the bar code reader 3. In cases where the specifications of the stimulable phosphor sheet 1 are such that the stimulable phosphor sheet 1 allows detection of an image signal from its one surface alone, the parameter setting means sets the parameters for the operation processing such that an image is constituted from only the image signal detected from the one surface of the stimulable phosphor sheet 1.

The stimulable phosphor sheet 1 is then conveyed by the endless belts 9b and 9c in the sub-scanning direction indicated by the arrow Y. The laser beam 11, which has been produced by the laser beam source 10, is reflected and deflected by the rotating polygon mirror 12, which is being driven by the motor (not shown) and quickly rotated in the direction indicated by the arrow. The laser beam 11 is then converged by the scanning lens 19 onto the stimulable phosphor sheet and is caused to scan the stimulable phosphor sheet 1 in the main scanning directions indicated by the double headed arrow X. The, main scanning directions are approximately normal to the sub-scanning direction indicated by the arrow Y. When the stimulable phosphor sheet 1 is thus exposed to the laser beam 11, light in accordance with the stored radiation image information is emitted by the exposed portion of the stimulable phosphor sheet 1. Specifically, light 13a is emitted from the upper surface side of the stimulable phosphor sheet 1, and light 13b is emitted from the lower surface side of the stimulable phosphor sheet 1.

The light 13a, which has been emitted from the upper surface side of the stimulable phosphor sheet 1 impinges upon a light input face of the light guide member 24a. The emitted light 13a enters the light guide member 24a from its light input face and is guided through repeated total reflection inside of the light guide member 24a. The emitted light 13a then emanates from a light output face of the light guide member 24a and is received by the photomultiplier 25a. In this manner, the emitted light 13a is converted by the photomultiplier 25a into an analog electric signal $S_A$, which is in accordance with the amount of the emitted light 13a, which amount represents the stored radiation image information. In the same manner as that described above, the emitted light 13b, which has been emitted from the lower surface side of the stimulable phosphor sheet 1, is guided inside of the light guide member 24b and is photoelectrically detected by the photomultiplier 25b. The emitted light 13b is converted by the photomultiplier 25b into an analog electric signal $S_B$. In this manner, two electric signals $S_A$ and $S_B$ representing the radiation image information are obtained.

The electric signal $S_A$, which has been generated by the photomultiplier 25a, is successively fed into the logarithmic amplifier 26a, the filter 27a, and the analog-to-digital converter 28a. Ultimately, the electric signal $S_A$ is converted into an image signal S1. The image signal S1 is fed out from the analog-to-digital converter 28a and fed into the operation processing circuit 40. Also, the electric signal $S_B$, which has been generated by the photomultiplier 25b, is successively fed into the logarithmic amplifier 26b, the filter 27b, and the analog-to-digital converter 28b. Ultimately, the electric signal $S_B$ is converted into an image signal S2. The image signal S2 is fed out from the analog-to-digital converter 28b and fed into the operation processing circuit. 40. The image signal S1, which has been obtained by detecting the light 13a emitted from the upper surface side of the stimulable phosphor sheet 1, will hereinbelow be referred to as the stimulating ray irradiation surface side image signal S1. Also, the image signal S2, which has been obtained by detecting the light 13b emitted from the lower surface side of the stimulable phosphor sheet 1, will hereinbelow be referred to as the other surface side image signal S2.

The operation processing circuit 40 receives the stimulating ray irradiation surface side image signal S1 and the other surface side image signal S2. The operation processing circuit 40 performs an addition operation on the stimulating ray irradiation surface side image signal S1 and the other surface side image signal S2 and in accordance with the parameters for the operation processing having been set by the parameter setting means 50. From the addition operation, an addition image signal S3 representing a superposition image is obtained as the operation-processed image signal.

As illustrated in FIG. 3, the operation processing circuit 40 comprises a masking operation circuit 41 for performing a masking operation on the stimulating ray irradiation surface side image signal S1, and a masking operation circuit 42 for performing a masking operation on the other surface side image signal S2. The operation processing means 40 also comprises addition means 43 for performing the addition operation on a stimulating ray irradiation surface side image signal S1', which has been obtained from the masking operation, and an other surface side image signal S2', which has been obtained from the masking operation. In this manner, the addition operation is performed on the image signals S1' and S2' having been obtained from the filtering processing with the masking operations.

As the filtering processing with the masking operations, one of various known filtering processing techniques may be employed. For example, a processing technique for performing wavelet transform on an image signal to obtain wavelet transform factor signals of different frequency bands may be employed. The processing technique for performing the wavelet transform is disclosed in, for example, Japanese Unexamined Patent Publication No. 7(1995)-319092. In cases where the processing technique disclosed in Japanese Unexamined Patent Publication No. 7(1995)-319092 is employed, in the addition means 43, the addition operation may be performed with weight factors appropriate for each of the stimulating ray irradiation surface side and the other surface side and with respect to each of the frequency bands.

As described above, in the operation processing circuit 40, the parameters for the operation processing corresponding to the specifications of the stimulable phosphor sheet 1 are set. Therefore, in the masking operation circuit 41 and the masking operation circuit 42, the masking operations are performed by utilizing weight factors for obtaining good image quality in each frequency in accordance with the set parameters for the operation processing. In this manner, the addition image signal S3 appropriate for the specifications of the stimulable phosphor sheet 1 is obtained from the addition means 43.

As described above, in cases where the specifications of the stimulable phosphor sheet 1 are such that the stimulable phosphor sheet 1 allows detection of an image signal from its one surface alone, the parameters for the operation processing are set such that an image is constituted from only the image signal detected from the one surface of the stimulable phosphor sheet 1. Therefore, in such cases, for example, the electric signal $S_B$ having been detected from the other surface side of the stimulable phosphor sheet 1 is ignored, and the signal based upon only the electric signal $S_A$ having been detected normally from the stimulating ray irradiation surface side of the stimulable phosphor sheet 1 is outputted as the addition image signal S3.

The addition image signal S3, which has been formed by the operation processing circuit 40, is fed into the image processing circuit 60. In the image processing circuit 60, predetermined image processing is performed on the addition image signal S3. The thus processed image signal is fed into image output means (not shown), such as a CRT display device, and utilized for outputting a visible image.

As described above, with the embodiment of the radiation image information read-out method and apparatus in accordance with the present invention, wherein the technique for detecting light emitted from opposite surfaces of a stimulable phosphor sheet and thereby detecting two image signals from the opposite surfaces of the stimulable phosphor sheet is employed, the appropriate read-out processing is set, i.e. the appropriate read-out sensitivities, the appropriate read-out gains, and appropriate parameters for the operation processing are set, in accordance with the specifications of the stimulable phosphor sheet. Therefore, an appropriate visible image can be outputted regardless of the specifications of the stimulable phosphor sheet.

In the embodiment described above, the specifications of the stimulable phosphor sheet 1 are discriminated by reading the bar code appended to the stimulable phosphor sheet 1. Alternatively, for example, an identification (ID) code representing the specifications of the stimulable phosphor sheet 1 may be inputted from a keyboard, or the like.

Also, in the embodiment described above, both of the read-out sensitivity and the read-out gain are controlled (set) in accordance with the specifications of the stimulable phosphor sheet. Alternatively, only either one of the read-out sensitivity and the read-out gain may be controlled.

Further, in the embodiment described above, the operation processing circuit 40 performs the addition operation. However, the radiation image information read-out method and apparatus in accordance with the present invention are not limited to the embodiment described above. For example, a stimulable phosphor sheet, on which a high energy image for energy subtraction processing has been recorded with radiation having a high energy level and a low energy image,for energy subtraction processing has been recorded with radiation having a low energy level, may be employed. A high energy image signal, which represents the high energy image, may be detected with the photomultiplier 25*a*. Also, a low energy image signal, which represents the low energy image, may be detected with the photomultiplier 25*b*. Further, in the operation processing circuit 40, a subtraction operation may be performed on the high energy image signal and the low energy image signal.

In addition, all of the contents of Japanese Patent Application Nos. 11(1999)-185351 and 2000-178385 are incorporated into this specification by reference.

What is claimed is:

1. A radiation image information read-out method, comprising the steps of:

i) exposing a stimulable phosphor sheet, on which radiation image information has been stored, to stimulating rays, which cause the stimulable phosphor sheet to emit light in proportion to the amount of energy stored thereon during its exposure to radiation, and ii) detecting light emitted from opposite surfaces of the stimulable phosphor sheet when the stimulable phosphor sheet is exposed to the stimulating rays, two original image signals representing the radiation image information being thereby acquired, wherein a read-out sensitivity and/or a read-out gain with respect to at least either one surface side of the stimulable phosphor sheet at the time of the image signal acquisition is controlled in accordance with specifications of the stimulable phosphor sheet.

2. A method as defined in claim 1 wherein the controlling is performed such that the read-out sensitivities with respect to the opposite surfaces of the stimulable phosphor sheet become approximately identical with each other, and/or such that the read-out gains with respect to the opposite surfaces of the stimulable phosphor sheet become approximately identical with each other.

3. The method of claim 1, wherein the read-out sensitivity and/or the read-out gain is controlled in accordance with at least one of: a particle size of the stimulable phosphor sheet, a composition of the stimulable phosphor sheet, and a sensitivity of the stimulable phosphor sheet.

4. The method of claim 3, wherein the read-out sensitivity is adjusted such that a center value of the emitted light corresponds to a center value of an output range as previously determined, and the read-out gain is adjusted so that a width of a range of outputs of the emitted light corresponds to a range of outputs as previously determined.

5. The method of claim 4, further comprising reading a bar code associated with the stimulable phosphor sheet to obtain the specification information of the stimulable phosphor sheet, said reading of the bar code performed during a scanning operation of the stimulable phosphor sheet.

6. A radiation image information read-out method, comprising the steps of:

i) exposing a stimulable phosphor sheet, on which radiation image information has been stored, to stimulating rays, which cause the stimulable phosphor sheet to emit light in proportion to the amount of energy stored thereon during its exposure to radiation, ii) detecting light emitted from opposite surfaces of the stimulable phosphor sheet when the stimulable phosphor sheet is exposed to the stimulating rays, two original image signals representing the radiation image information being thereby obtained, and iii) performing operation processing on the two original image signals to obtain an operation-processed image signal, which represents the radiation image information, wherein parameters for the operation processing are set in accordance with specifications of the stimulable phosphor sheet.

7. The method of claim 6, wherein the parameters for operation processing are set in accordance with at least one of: a particle size of the stimulable phosphor sheet, a composition of the stimulable phosphor sheet, and a sensitivity of the stimulable phosphor sheet.

8. The method of claim 7, further comprising reading a bar code associated with the stimulable phosphor sheet to obtain the specification information of the stimulable phosphor sheet, said reading of the bar code performed during a scanning operation of the stimulable phosphor sheet.

9. A radiation image information read-out apparatus, comprising:

i) stimulating ray irradiation means for irradiating stimulating rays to a stimulable phosphor sheet, on which radiation image information has been stored, the stimulating rays causing the stimulable phosphor sheet to emit light in proportion to the amount of energy stored thereon during its exposure to radiation, and ii) image signal acquiring means for detecting light emitted from opposite surfaces of the stimulable phosphor sheet when the stimulable phosphor sheet is exposed to the stimulating rays, and thereby acquiring two original image signals representing the radiation image information, wherein the improvement comprises the provision of control means for controlling a read-out sensitivity and/or a read-out gain with respect to at least either one surface side of the stimulable phosphor sheet at the time of the image signal acquisition, the controlling being performed in accordance with specifications of the stimulable phosphor sheet.

10. An apparatus as defined in claim 9 wherein the control means performs the controlling such that the read-out sensitivities with respect to the opposite surfaces of the stimulable phosphor sheet become approximately identical with each other, and/or such that the read-out gains with respect to the opposite surfaces of the stimulable phosphor sheet become approximately identical with each other.

11. An apparatus as defined in claim 10 further comprising discrimination means for discriminating the specifications of the stimulable phosphor sheet.

12. An apparatus as defined in claim 9 further comprising discrimination means for discriminating the specifications of the stimulable phosphor sheet.

13. The apparatus of claim 9, wherein the read-out sensitivity and/or the read-out gain is controlled in accordance with at least one of: a particle size of the stimulable phosphor sheet a composition of the stimulable phosphor sheet, and a sensitivity of the stimulable phosphor sheet.

14. The apparatus of claim 13, wherein the read-out sensitivity is adjusted such that a center value of the emitted light corresponds to a center value of an output range as previously determined, and the read-out gain is adjusted so that a width of a range of outputs of the emitted light corresponds to a range of outputs as previously determined.

15. The apparatus of claim 14, further comprising reading means for reading a bar code associated with the stimulable phosphor sheet to obtain the specification information of the stimulable phosphor sheet, said reading of the bar code performed during a scanning operation of the stimulable phosphor sheet.

16. A radiation image information read-out apparatus, comprising:

i) stimulating ray irradiation means for irradiating stimulating rays to a stimulable phosphor sheet, on which radiation image information has been stored, the stimulating rays causing the stimulable phosphor sheet to emit light in proportion to the amount of energy stored thereon during its exposure to radiation, ii) image signal acquiring means for detecting light emitted from opposite surfaces of the stimulable phosphor sheet when the stimulable phosphor sheet is exposed to the stimulating rays, and thereby acquiring two original image signals representing the radiation image information, and iii) operation-processed image signal forming means for performing operation processing on the two original image signals to obtain an operation-processed image signal, which represents the radiation image information, wherein the improvement comprises the provision of parameter setting means for setting parameters for the operation processing in accordance with specifications of the stimulable phosphor sheet.

17. An apparatus as defined in claim 16 further comprising discrimination means for discriminating the specifications of the stimulable phosphor sheet.

18. The apparatus of claim 16, wherein the parameters for operation processing are set in accordance with at least one of: a particle size of the stimulable phosphor sheet, a composition of the stimulable phosphor sheet, and a sensitivity of the stimulable phosphor sheet.

19. The apparatus of claim 18, further comprising reading device for reading a bar code associated with the stimulable phosphor sheet to obtain the specification information of the stimulable phosphor sheet, said reading of the bar code performed during a scanning operation of the stimulable phosphor sheet.

* * * * *